April 12, 1932. J. TSCHOPP 1,854,004
FILM GUIDE ROLLER
Filed July 26, 1927

Inventor
Jacob Tschopp,
by *Alexander F. Lunt*
His Attorney.

Patented Apr. 12, 1932

1,854,004

UNITED STATES PATENT OFFICE

JACOB TSCHOPP, OF SCHENECTADY, NEW YORK, ASSIGNOR TO GENERAL ELECTRIC COMPANY, A CORPORATION OF NEW YORK

FILM GUIDE ROLLER

Application filed July 26, 1927. Serial No. 208,644.

My invention relates to apparatus employing a photographic film such as a motion picture machine, apparatus for recording sounds on, or apparatus for reproducing sounds from a film and an object of my invention is the provision of an improved guide roller for the film.

My invention will be better understood from the following description taken in connection with the accompanying drawings, and its scope will be pointed out in the appended claims.

Figure 1:
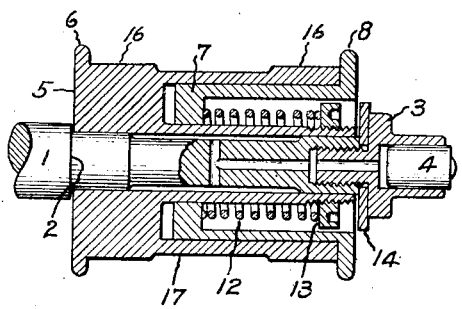
Figure 2:
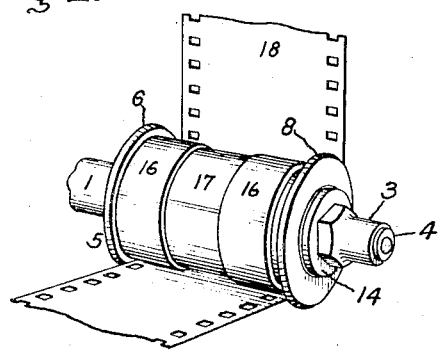

Referring to the drawings, Fig. 1 is a cross section of a guide roller involving my invention and Fig. 2 is a perspective view of the same as it appears engaged by a film.

In the drawings, 1 is a stud or post upon which is journalled the rotatable portion of the roller. It has the shoulder 2 and the retaining member 3 which is shown screwed into the outer end thereof and in which is set the oiler 4, suitable oil passages being provided through the stud and the retaining member. The rotatable portion comprises the cylindrical member 5 having the flange 6 and constructed to have bearings on the stud at axially spaced points. Slidably mounted on the member 5 is the hollow cylindrical member 7 having the flange 8, and within this member is the light coil spring 12 abutting at opposite ends against the member and the adjusting nut 13 threaded on the member 5. I have shown the wear plate 14 between the end of member 5 and the retaining member 3 and the diameter of this plate is such that the flanged end of member 7 when moved to the right as seen in drawings against the spring will freely pass past the plate. In accordance with this construction the spring engages only rotating parts of the roller and thereby does not offer any frictional resistance to the free rotation thereof. It is also entirely enclosed and protected by the part 7. The outer or film engaging portion 16 of member 5 is shown having a shallow recess 17 and this portion by engaging the flange 8 of the other member will limit the distance which the flanges may approach each other. The minimum distance between the flanges 6 and 8 is slightly less than the narrowest film that will be used or the narrowest portion thereof so that the two edges of the film as it pasess over the roller always engage the respective flanges. While I have shown member 5 having the portion 16 integral therewith it may be found expedient to make this portion separate from but secured to member 5. Since member 5 is held against the shoulder 2 of the stud, that edge of the film which contacts with flange 6 is thereby guided to run in a relatively fixed position. Any variation in the width of the film will be taken up by the automatically adjustable member 7. The spring 12 is relatively light and may be adjusted by turning the nut 13.

What I claim as new and desire to secure by Letters Patent of the United States, is:

1. A film guide roller comprising a fixed stud, a plurality of rotatable flanged members mounted thereon to have relative axial movement, and a resilient member enclosed by one of said members and arranged to engage said members for moving them toward each other and to be rotatable therewith for producing said relative axial movement.

2. A film guide roller comprising a fixed stud, a pair of rotatable flanged members thereon, one of said members being mounted on the other for axial movement relative thereto, and a resilient member engaging said rotatable members and tending to move them axially toward each other, said resilient member being arranged within one of said members.

3. A film guide roller comprising a stud, a pair of rotatable flanged members mounted thereon for relative axial movement, one of said members having an opening therein, a spring in said opening engaging said members and arranged to move the members toward each other, and means for varying the tension of the spring.

4. A film guide roller comprising a stud, a rotatable flanged member thereon, a second flanged member mounted on the first member, one of said members being hollow, and a compression spring within the hollow member and engaging both said members for causing the flanges thereof to move toward each other.

5. A film guide roller comprising a fixed stud, a cylindrical flanged member journalled thereon, means for retaining the member on the stud, a second flanged member journalled on the first member and axially slidable thereon independent of said retaining means, and a spring enclosed by said second member and rotatable therewith for sliding the second member relative to the first member.

6. A film guide roller comprising a fixed stud having a shoulder and a retaining member spaced therefrom, a cylindrical flanged member journalled on the stud between the shoulder and the retaining member, a hollow cylindrical flanged member mounted on the first member, a spring within said hollow member engaging the same at one end, an adjustable member on said first member engaging the spring at the other end, one of said members having a peripheral film engaging portion for limiting the distance between the flanges of said members.

In witness whereof I have hereunto set my hand this 23d day of July, 1927.

JACOB TSCHOPP.